United States Patent [19]
Ivanova

[11] Patent Number: 6,145,812
[45] Date of Patent: Nov. 14, 2000

[54] JACK

[75] Inventor: Elena Anatolievna Ivanova, Pretoria, South Africa

[73] Assignee: Scambia Industrial Developments Aktiengesellschaft, Schaan, Liechtenstein

[21] Appl. No.: 08/947,367

[22] Filed: Oct. 8, 1997

[30] Foreign Application Priority Data

Oct. 8, 1996 [ZA] South Africa ............................ 968486

[51] Int. Cl.[7] .................................................. B66F 3/16
[52] U.S. Cl. ........................................................ 254/103
[58] Field of Search .................................. 254/420, 425, 254/102, 103, DIG. 1

[56] References Cited

U.S. PATENT DOCUMENTS

| | | | |
|---|---|---|---|
| 1,593,217 | 7/1926 | Lucker | 254/103 |
| 1,888,776 | 11/1932 | Snell | 254/103 |
| 3,715,931 | 2/1973 | Littmann | 74/411 |
| 3,862,577 | 1/1975 | Graafsma et al. . | |
| 3,938,240 | 2/1976 | Holden . | |
| 4,000,880 | 1/1977 | Graafsma | 254/103 |
| 4,015,825 | 4/1977 | Graafsma et al. | 254/DIG. 1 |
| 4,127,343 | 11/1978 | Potter | 254/102 |
| 4,189,821 | 2/1980 | Potter . | |
| 4,254,540 | 3/1981 | Bilak | 29/159.2 |
| 4,514,015 | 4/1985 | Sullivan . | |
| 4,796,345 | 1/1989 | Krapfenbauer | 29/159.2 |
| 5,118,082 | 6/1992 | Byun | 254/103 |

FOREIGN PATENT DOCUMENTS

| | | |
|---|---|---|
| 552918 | 5/1923 | France . |
| 1287549 | 1/1969 | Germany . |

*Primary Examiner*—Robert C. Watson
*Attorney, Agent, or Firm*—Brown & Wood, LLP

[57] ABSTRACT

The vehicle jack comprises a support having a base plate and a cap bordering together an interior space. The latter contains a bevel gear with a first gearwheel rotatable about a first, inclined axis and a second gearwheel rotatable about a second, vertical axis. The base plate and the second gearwheel comprise annular guiding and rolling surfaces guiding together a set of rolling bodies, viz. balls, so that the base plate, the second gearwheel and the rolling bodies form together a rolling bearing. The base plate and the gearwheels are formed of sheet metal members. The shapes of said annular guiding surfaces and of the teeth of the gearwheels are defined substantially by plastic, non-cutting shaping. The jack can be light and can be manufactured and assembled at low costs.

28 Claims, 4 Drawing Sheets

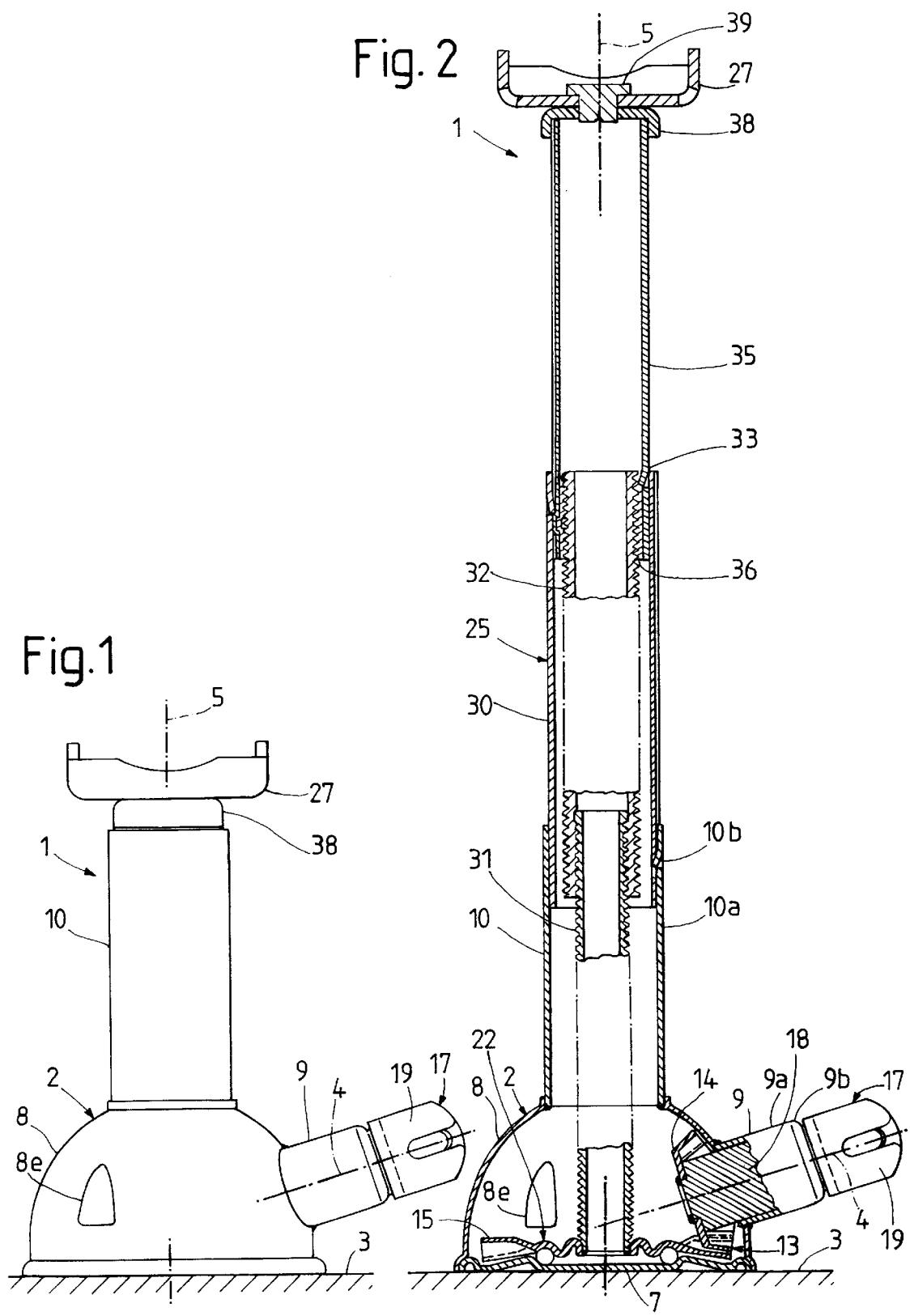

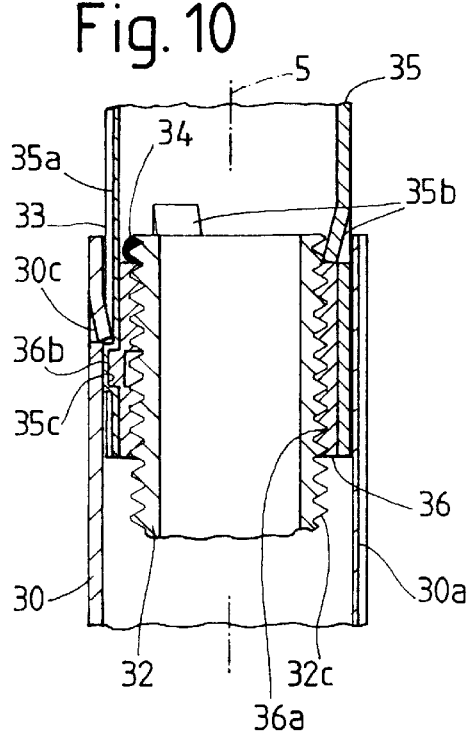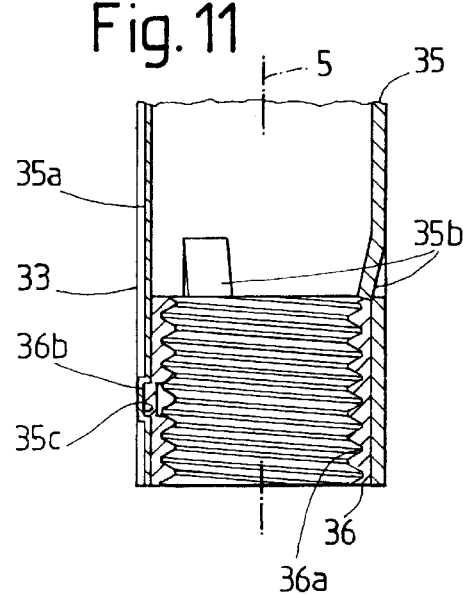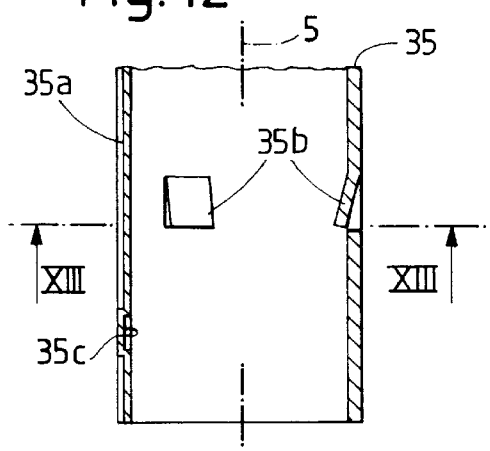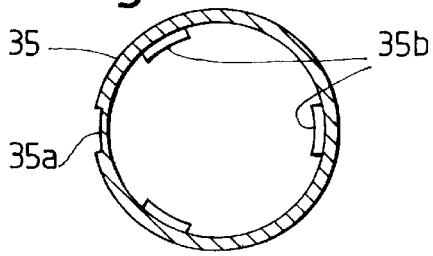

JACK

BACKGROUND OF THE INVENTION

1. Field of the invention

The invention relates to a jack and, in particular, to a vehicle jack which can be used for lifting and/or lowering a vehicle and which can also be carried along in said vehicle, e.g. a motor car.

2. Description of the prior art

A vehicle jack disclosed in the French patent 552 918 comprises a support supporting a first and a second bevel gearwheel and a transferring means which is operatively connecting the second gearwheel with a load carrier for engaging a load. A base plate of the support and the second gearwheel comprise annular grooves which guide together a set of balls. The base plate, balls and second gearwheel form together a ball bearing. The quoted French patent doesn't disclose the manufacturing of the jack. However, the shapes and great material thicknesses of the base plate, second gearwheel and other parts indicate that the base plate, the gearwheels and also various parts of the transferring means are manufactured substantially by chip removal operations—such as turning and milling—or possibly by casting and by subsequent chip removal operations. Manufacturing the base plate, the gearwheels and other parts of the jack at least partly by chip removal operations needs a lot of time, entails considerable costs and gives rise to waste material which gets "lost" and must be disposed of. A jack of the kind shown in the French patent has moreover a relatively great weight. This is particularly disadvantageous for vehicle jacks intended to be carried along in a motor car or other vehicle.

The U.S. Pat. No. 3,862,577 discloses a screw jack which possesses a support, a first gearwheel, a second gearwheel and a transferring means connecting the second gearwheel operatively with a load carrier. The second gearwheel, viz. the crown gear, is supported by a sliding bearing means which has the drawback that it gives a relatively high friction. The first gearwheel, viz. the pinion, is manufactured by cutting a cylindrical blank which is then submitted to five plastic shaping operations by means of different dies. Although the teeth of the first gearwheel are formed by plastic shaping, the manufacturing of this gearwheel is expensive because it requires a great number of shaping operations and of different dies. The manufacturing of the second gearwheel, i.e. the crown gear, is not disclosed in the U.S. patent. It appears as probable that the second gearwheel is produced in a conventional manner, in which the second gearwheel and particularly the teeth thereof are formed at least partly by costly chip removal operations.

The German patent application 1 287 549 discloses the production of spur-toothed wheels and of bevel gears by rolling, i.e. flow-turning, blanks which consist of cylindrical rings or annular disks. A blank to be shaped is inserted into a die which has a toothed surface and is then rotated together with the blank. During rotation of the die, a roller is displaced in such a manner that it presses the blank sucessively into the die. Such a shaping operation takes still quite a long time and requires a very precise positioning and displacement of the roller so that gearwheels manufactured in this manner are still expensive. The German patent application contains by the way no information how the gearwheels are to be supported and what they may be used for.

SUMMARY OF THE INVENTION

It is an object of the invention to overcome disadvantages of the known jacks and, more specifically, to provide a jack which is light and can be manufactured at low costs in comparison with the maximum load that can be lifted and/or lowered by the jack, wherein particularly the bearing means for supporting the second gearwheel shall have a low weight and shall be manufacturable rapidly and economically.

The foregoing object and other objects are attained according to an aspect of the invention by providing a jack comprising a support, a first gearwheel, a second gearwheel, a transferring means and a load carrier for supporting a load, the support and the second gearwheel having annular guiding surfaces which guide together rolling bodies so that the latter, said support and said second gearwheel constitute together a rolling bearing, the gearwheels having mutually meshing teeth, the transferring means connecting the second gearwheel operatively in such a manner with the load carrier that a rotation of the second gearwheel gives rise to a movement of the load carrier, wherein at least one of the annular guiding surfaces is formed of a sheet metal member and has a cross-sectional shape which is defined substantially by plastic shaping.

According to another aspect of the invention, there is provided a method for manufacturing a jack comprising a support, a first gearwheel, a second gearwheel, a transferring means and a load carrier for supporting a load, the support and the second gearwheel having annular guiding surfaces which guide together rolling bodies so that the latter, said support and said second gearwheel constitute together a rolling bearing, the gearwheels having mutually meshing teeth, the transferring means connecting the second gearwheel operatively in such am manner with the load carrier that a rotation of the second gearwheel gives rise to a movement of the load carrier, wherein at least one sheet metal member is provided for forming at least one guiding surface and is plastically shaped so that a cross-sectional shape of the respective guiding surface is formed substantially by plastic shaping.

BRIEF DESCRIPTION OF THE DRAWINGS

An example of the preferred embodiment of the invention is represented in the accompanying drawings. In the drawings, there show FIG. 1 a side elevation of a vehicle jack, the load carrier thereof being in the lowermost position, FIG. 2 a vertical section through the jack, the load carrier being in the uppermost position, FIG. 3 a vertical section through the lower portion of the jack along the line III—III of FIG. 4 on a larger scale than the FIGS. 1 and 2, FIG. 4 a top view of the support of the jack, FIG. 5 an axial section through the first gearwheel of the jack, FIG. 6 an end view of the first gearwheel, FIG. 7 an axial section through the second gearwheel of the jack along the line VII—VII of FIG. 8, FIG. 8 a top view of the second gearwheel, FIG. 9 a developed view of a part of the second gearwheel in the direction of the arrow IX in FIG. 8, FIG. 10 a detail of FIG. 2 on a larger scale, FIG. 11 an axial section through the tubular part and the thread bush of the third thread member of the jack, FIG. 12 an axial section through the separate tubular part of the third thread member and FIG. 13 a cross-section through the tubular part along line XIII—XIII of FIG. 12.

DETAILED DESCRIPTION OF THE PREFERRED EMBODIMENT AND OF VARIANTS THEREOF

Figure 3:
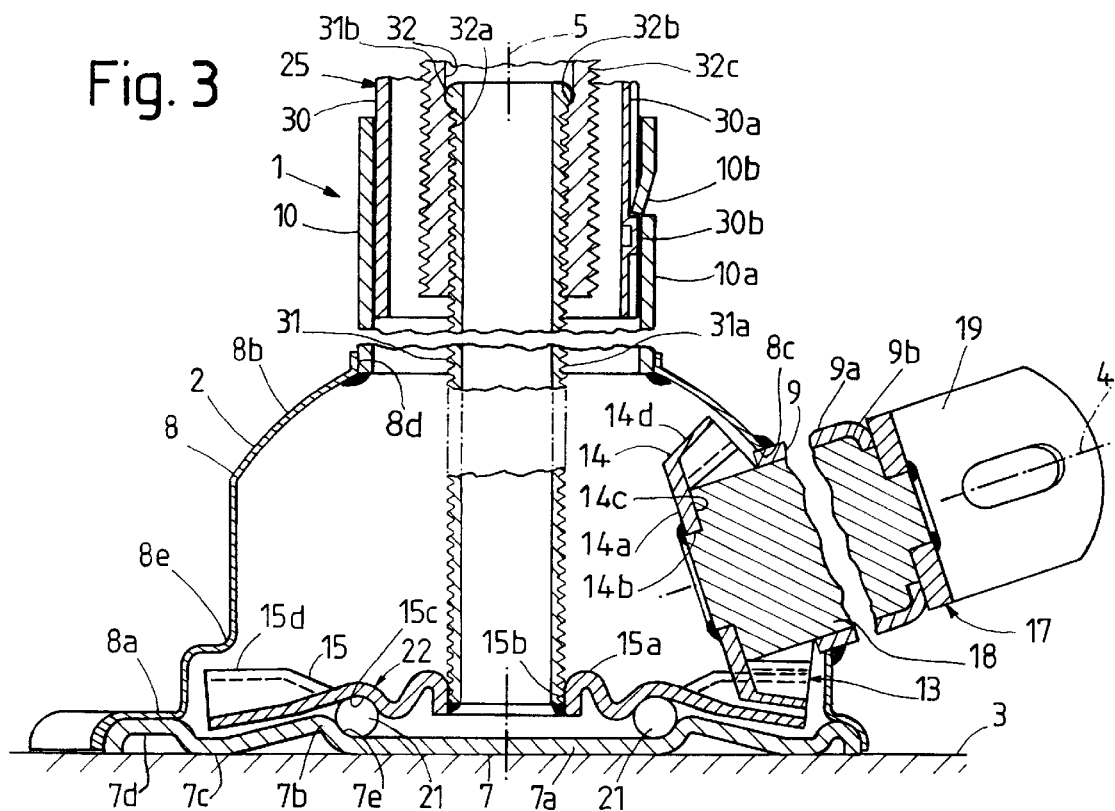
Figure 4:
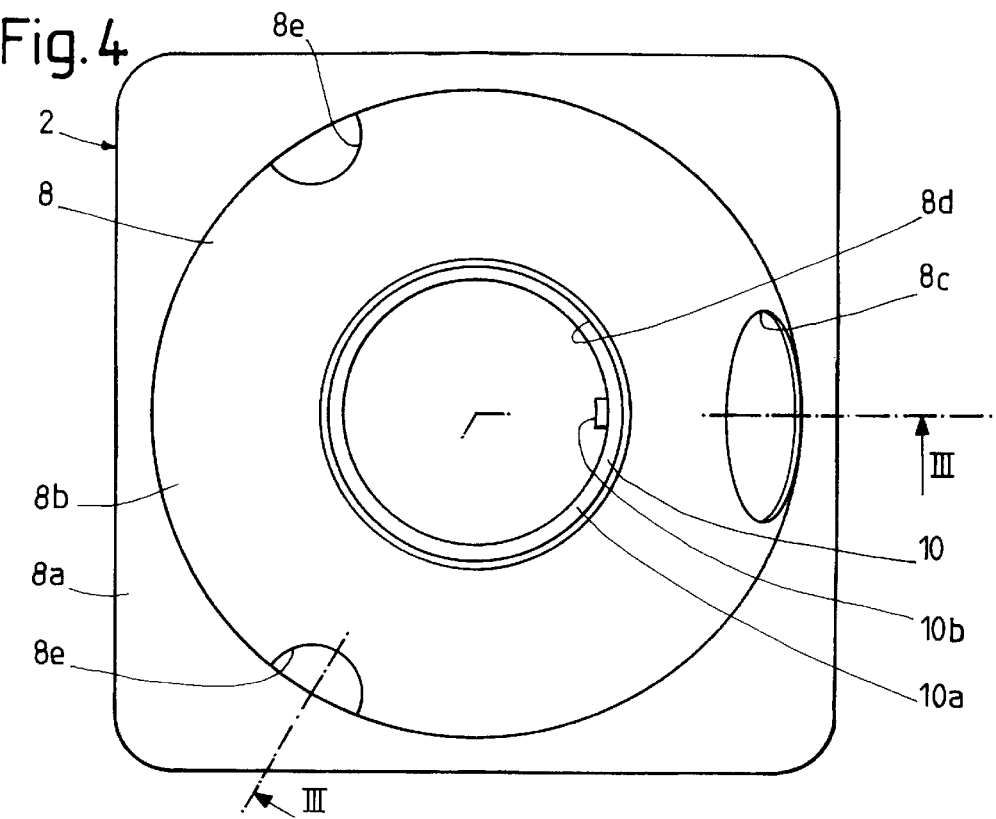

The vehicle jack 1 shown in the FIGS. 1 and 2 comprises a support 2 which is also shown in the FIGS. 3 and 4 can rest on a plain, horizontal supporting surface 3 of a ground or the like and constitutes a housing bordering an interior space. The support 2 defines a first axis 4 and a second axis 5. These axes are inclined and vertical, respectively, when the support 2 rests on the supporting surface 3. The support 2 comprises a base plate 7, a cap 8, a bearing bushing 9 and a guiding tube 10. Each of these support parts 7, 8, 9, 10 consists of an originally separate integer, i.e. one-piece part of a ductile, metallic material, namely steel.

The base plate 7 has in top view for instance a generally quadrilateral, namely generally square contour, wherein the edge of the base plate has for instance four straight edge portions connected by arcuate transition portion. The base plate 7 consists of a sheet metal member and includes—from the center outward—a plain, circular central portion 7a, an annular projection 7b protruding upward, an annular supporting portion 7c and an outer portion 7d. The under sides of the central portion 7a and of the supporting portion 7c and the edge of the base plate 7 define together a plain surface and rest on the supporting surface 3. The subportions of the central portion 7a and of the projection 7b being adjacent to one another form together a transitional portion defining an annular guiding and rolling surface 7e on the upper side of the base plate.

The cap 8 consists of a sheet metal member and has a base portion 8a and a main portion 8b disposed above the latter. The base portion 8a has a substantially square contour, is partially curved in cross-sections, fits to the outer portion 7d and to the edge of the base plate 7 and sits snugly on the outer portion 7d. The cap 8 is rigidly and undetachably fastened to the base plate 7, e.g. tack and/or projection welded to the latter at some spots distributed along the edge of the base plate. The main portion 7b of the cap 8 is substantially rotationally symmetric to the second axis 5, dome-shaped and convexly curved in sections running through the second axis 5. The main portion 8b is provided with a laterally disposed hole 8c and with an aperture 8d disposed on top of the cap 8. The major portion 8b is further provided with two indentations 8e. The hole 8c and the two indentations 8e are equally distributed about the second axis 5 in a top view.

The bearing bush 9 is rigidly and undetachably fastened to the cap 8 by a weld seam at the edge of the hole 8c and protrudes outward away of the cap 8. The hole 8c and the bearing bush 9 are coaxial to the first axis 4 and define together the latter. The bush 9 is open at both ends and has a wall 9a with a cylindrical main portion and a restriction 9b at the outer end of the bush.

The guiding tube 10 is rigidly and undetachably fastened by a weld seam to the cap 8 at the top of the latter and projects away from the base plate 7 and the cap 8. The aperture 8d of the cap 8 and the guiding tube 10 are coaxial to the second axis 5 and define together this axis. The guiding tube 10 is open at both ends and has a cylindrical wall 10a provided with an inward protruding indentation 10b near the upper end of the guiding tube 10.

The jack includes a bevel gear 13 having a first gearwheel 14, i.e. a pinion, and a second gearwheel 15, i.e. a crown wheel. The two gearwheels 14, 15 are disposed in the interior space of the housing formed by the support 2. The first gearwheel 14 is rotatable about the first axis 4. The second gearwheel 15 is rotatable about the second axis 5. The two axes 4, 5 intersect one another above the base plate 7 and for instance slightly above the second gearwheel 15 and form together an angle which is at least 45°, less than 90°, preferably 60° to 80° and for instance 70° to 75°. The section of the first axis 4 disposed within the first gearwheel 14 is inclined upward and away from the base plate 7 in a direction directed away from the second axis.

Figure 5:
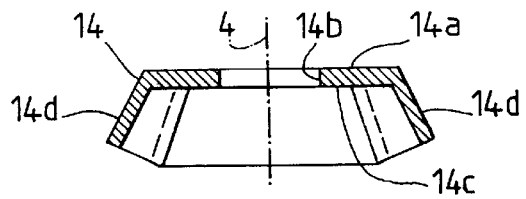
Figure 6:
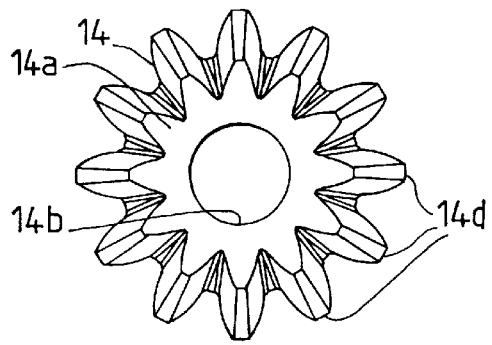

The first gearwheel 14 is separately represented in the FIGS. 5 and 6 and comprises a substantially flat central portion 14a provided with a throughgoing hole 14b which is circular and coaxial to the first axis 14. The central portion 14a has a flat resting surface 14c which is right-angled to the first axis 4. The first gearwheel 14 comprises a set of teeth 14d which are contiguous with the central portion 14a and inclined away from the latter on the side forming the resting surface 14c. The teeth 14c defines together a cone-shaped, pitch surface (not shown) forming with the first axis 4 a pitch angle which is preferably less than 45° and for instance 10° to 30°.

Figure 7:
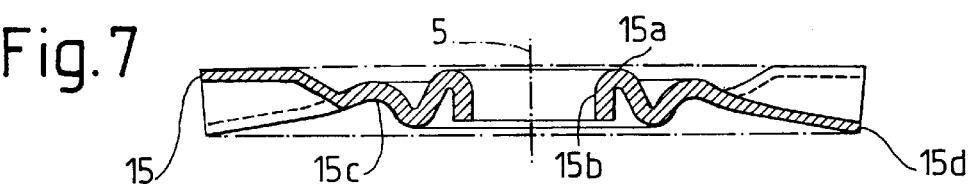
Figure 8:
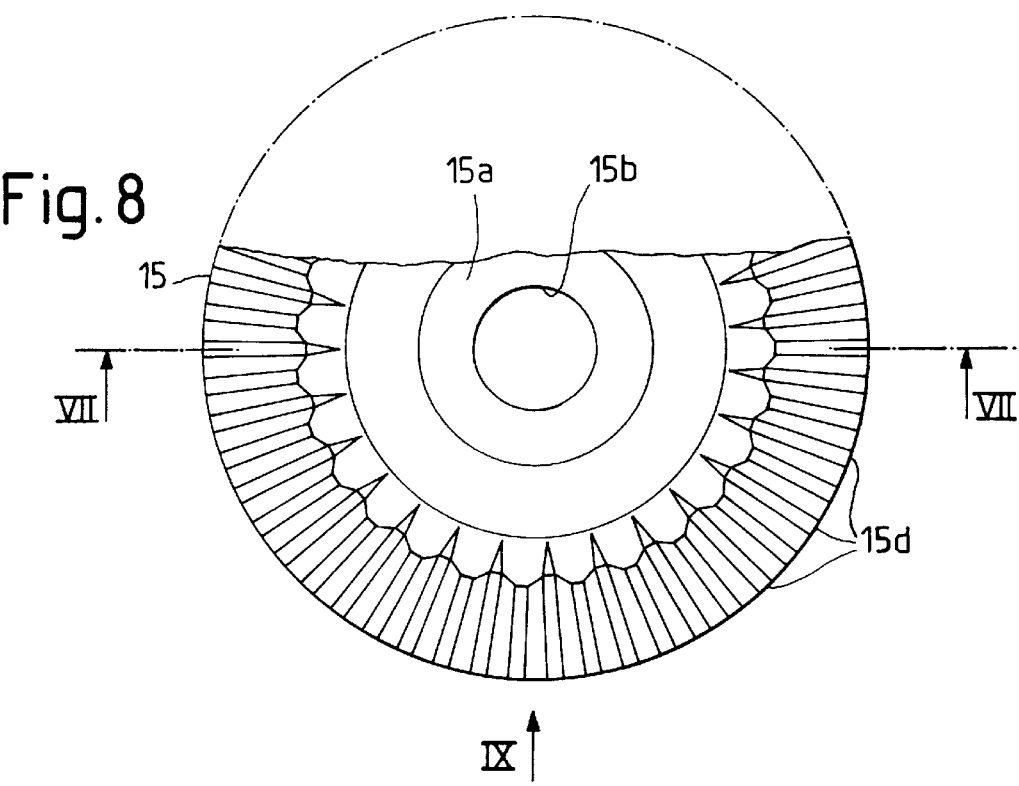
Figure 9:
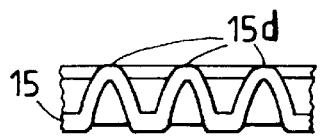

The second gearwheel 15 separately shown in the FIGS. 7, 8 and partly in FIG. 9 comprises a central portion 15a provided with a throughgoing central hole 15b. The part of the central portion running outwards from the central hole is approximately Z-shaped and/or S-shaped in a radial section running through the second axis 5 in such a manner that the inner surface of the innermost part forms a collar bordering the hole 15b, the latter being at least partially cylindrical. The outer section of the central portion 15a borders an annular guiding and rolling surface 15c on the under side of the second gearwheel 15. The second gearwheel comprises a set of teeth 15d. These teeth are contiguous with the central portion 15a and define together a pitch surface (not shown) which forms a very blunt cone so that the pitch angle between this pitch surface and the second axis 5 is for instance at least 80° and less than 90°.

The teeth 14d, 15d of the two gearwheels 14 and 15, respectively are mutually meshing when the jack is assembled. The teeth 14d, 15d have profiles including flanks which are convexly curved, namely at least substantially involute-shaped, in cross-sections as it may be seen in the FIGS. 6 and 9. Each gearwheel 14, 15 comprises an integer one-piece sheet metal member of a metallic material, namely steel, and having substantially the same thickness and substantially parallel opposite surfaces. Each gearwheel 14, 15 consists at least in part and preferably substantially exclusively of the respective sheet metal member, wherein particularly all teeth 14d, 15d of each gearwheel are formed of a portion of the respective sheet metal member. The sheet metal members form also bridges which connect neighboring teeth and bound and/or form the bottoms of the tooth spaces. The complete contours and shapes of the teeth 14d, 15d except to the outer rims thereof—thus substantially the complete shapes of the teeth and particularly the cross-sectional shapes and/or profiles of the teeth 14d, 15d—are defined substantially by plastic, non-cutting shaping of the teeth-forming portions of the sheet metal members. Each tooth has accordingly a groove-shaped recess on the rear side, i.e. on the side facing away from the respective other gearwheel. The first gearwheel 14 includes for instance an even number of teeth so that the diametrical sections through the gearwheel 14 shown in the FIGS. 2, 3 and 5 run through the tips of two teeth of the first gearwheel 14. The second gearwheel 15 includes for instance an uneven number of teeth, so that the diametrical sections through the second gearwheel 15 shown in the FIGS. 2 and 7 run on the left side through a tooth tip and on the right side through a tooth space of the second gearwheel 15. The number of teeth 15c of the second gearwheel 15 is further for instance divisible by three so that the section shown in FIG. 3 and running along the line III—III of FIG. 4 runs through two tooth spaces of the second gearwheel 15.

The second gearwheel 15, i.e. the crown wheel, includes more teeth than the first gearwheel 14, i.e. the pinion, which serves as driving gearwheel so that the bevel gear 13 is a reducing gear. The second gearwheel 15 includes preferably at most 2.5 times more teeth and at least 2 times more teeth than the first gearwheel 14 so that the gear ratio is between 2.5 and 2. The first gearwheel 14 includes for instance 12 teeth and the second gearwheel includes for instance 27 teeth so that the gear ratio is less than 2.5 and namely 2.25.

A driving member 17 comprises a driving shaft 18 and a handle adapter 19 and is rigidly and undetachably connected with the first gearwheel 14. The shaft 18 and the adapter 19 consist of steel and are connected by welding. The shaft 18 includes a cylindrical main portion which is provided at one end with a radial, flat surface resting against the resting surface 14c of the first gearwheel 14. The shaft 18 includes further a projection which penetrates the hole 14b of the first gearwheel 14 and is connected by welding with the latter. The cylindrical portion of the shaft 18 is disposed at least partly within the bearing bush 9 and rotatably supported by the latter. The restriction 9b of the bearing bush 9 protrudes into an annular groove between the driving shaft 18 and the handle adapter 19 and secures the driving member 17 against axial displacements. The bush 9 and the driving member 17 form thus together a first bearing means rotatably supporting the first gearwheel in the support 2.

The annular guiding and rolling surfaces 7e and 15c of the base plate 7 and the annular guiding surface of the second gearwheel is, respectively, are circular and coaxial to the second axis 5. The guiding and rolling surfaces have the shape of a groove and/or flute and/or step or the like. The cross-sectional shapes as well as the circumferential shapes and thus the complete shapes of the two guiding and rolling surfaces are defined substantially by plastic shaping. The two guiding and rolling surfaces 7e, 15c bound together a circular roll space or roll channel containing a set of rolling bodies 21, namely balls. The guiding and rolling surfaces hold and guide the rolling bodies in such a way that the rolling bodies can roll along the guiding and rolling surfaces, but cannot escape form said circular roll space or roll channel. The guiding surfaces 7e and 15c comprise—in cross-sections, i.e. in sections through the axis 5—a concavely curved portion having a radius of curvature which is at least approximately—and preferably precisely—equal to the ball radius of the balls forming the rolling bodies 21. The latter constitute together with the base plate 7 and the second gearwheel 15 a second bearing means rotatably supporting the second gearwheel 15 in the support 2, the second bearing means consisting of a rolling bearing 22, namely a ball bearing. It is pointed out that the rolling bearing 22 comprises no additional bearing ring and no additional cage and consists exclusively of the base plate 7, second gearwheel 15 and rolling bodies 21.

The jack 1 comprises further a transferring means 25 connecting the second gearwheel 15 operatively with a load carrier 27 in such a manner that the latter can be moved, i.e. displaced along the second axis 5 by rotating the second gearwheel, 15. The load carrier 27 is adapted for engaging and sustaining a load, i.e. a vehicle (not shown) which shall be raised and/or lowered. The transferring means is movably held by the support 2 and may possibly have an axial play at least in certain states. When the jack is in the using position and rests on a horizontal supporting surface 3 as shown in the FIGS. 1 to 3, the second gearwheel 15 is held in place by the weight of the second gearwheel itself, by the transferring means and possibly by a load sustains by the load carrier.

If the jack shall be carried along in a vehicle, the jack may possibly be brought in another position in which the second axis is for instance inclined or horizontal. The indentations 8e of the cap 8 and the first gearwheel 14 may then act as a stop and/or securing means which holds the second gearwheel 15 with some play in place so that the rolling bodies 21 cannot fall out of said roll space or channel in no position of the jack.

The transferring means 25 comprises a displaceable sleeve 30, a first thread member 31, a second thread member 32 and a third thread member 33. The displaceable sleeve 30 and all three thread members 31, 32, 33 are elongate and in general coaxial and rotationally symmetric to the second axis 5. At least two of the thread members—and namely all three thread members—are sleeve-shaped and/or tubular.

The displaceable sleeve 30, the first thread member 31 and the second thread member 32 consist each of an integer, one-piece tubular part open at both ends. The third thread member 33 consists of two separate parts. All mentioned parts of the transferring means 25 consist of ductile, metallic materials, namely steel.

The displaceable sleeve 30 has a wall with a substantially cylindrical outer surface and fits with small radial play in the guiding tube 10 of the support. The outer surface of the sleeve 30 is provided with an axial groove 30a extending along the entire sleeve. The sleeve is provided near the lower end of the groove 30a with a projection 30b which protrudes outward away of the ground of the groove, but is completely within the cylindrical enveloping surface defined by the cylindrical portion of the outer surface of the sleeve 30. The sleeve 30 is further provided with an indentation 30c which can be seen particularly well in FIG. 10. The indentation 30c is disposed near the upper end of the sleeve 30, for instance opposite the groove 30a.

The first thread member 31 has a wall provided with an external thread 31a extending at least approximately along the entire length of the thread member 31. The lower end portion of the thread member 31 projects into the hole 15b of the second gearwheel 15 and is rigidly connected with the latter by welding, wherein said end portion may be or may not be threaded. An annular enlargement is present at the upper end of the first thread member 31 and forms a stop portion 31b.

The throughgoing, axial hole of the second thread member 32 has at the lower end an end portion provided with an internal thread 32a and above the latter a wider main portion bordered substantially by a cylindrical, smooth, i.e. threadless, inner surface. The inner surface of the second thread member 32 has—at the transition between the internal thread 32a and the wider main portion of the axial hole—a stop surface 32b which forms at least in part an angle with the second axis 5. The second thread member 32 has an external thread 32c extending substantially over the entire length of the second thread member. A tack weld stop 34 consisting of a solidified drop of welding material is attached at the upper end of the external thread 32c, as shown in FIG. 10.

The third thread member 33 is partly also shown in the FIGS. 10 to 13 and consists—as already mentioned—of two separate parts, viz. a longer, one-piece tubular part 35 and a much shorter, one-piece thread bush and/or nut 36. The tubular part 35 has a generally cylindrical wall with an outer surface and an inner surface. However, the outer surface is provided with an axial groove 35a which extends over the entire length of the tubular part 35. The tubular part 35 comprises at least two and for instance three indentations 35b which are distributed about the second axis 5 in the lower end portion of the tubular part 35. The generally cylindrical inner surface of the tubular part 35 is provided with an indentation 35c between the lower end of the tubular part 35 and the indentations 35b in the portion of the tubular part forming the ground of the groove 35a. The indentation 35c causes—on the outer surface of the tubular part—a projection protruding outward from the ground of the groove, this projection being within the cylindrical enveloping surface defined by the cylindrical portion of the outer surface of the tubular part. The indentation 35c is by the way represented also in FIG. 12 showing a portion of the separate tubular part in spite of the fact that the indentation 35c is preferably produced only when the tubular part 35 and the thread bush and/or nut 36 have been assembled.

The thread bush and/or nut 36 comprises a wall having a cylindrical outer surface and is disposed in the lower end portion of the tubular part 35, fits in the latter and/or is pressed into the tubular part 35 and has an annular flat, upper end surface resting against the lower ends of the indentations 35b. The lower, annular, flat end surface of the thread bush and/or nut 36 is at least approximately flush with the lower, annular, flat end surface of the tubular member 35. The throughgoing axial hole of the thread bush and/or nut 36 is provided with an internal thread 36a. The thread bush and/or nut 36 is provided with a projection 36b which is formed by an indentation made in the inner surface of the thread bush and/or nut 36 and protrudes outward away from the second axis 5 into the indentation 35c present on the inner side of the tubular part 35.

Each indentation 10b, 30a and 35b consists of a tongue-shaped and/or nose-shaped wall portion shaped by cold plastic shaping, viz. notching, is barb-shaped in a section running through the second axis 5 and has an inner surface which is downward inclined toward the second axis 5 and a stop or rest surface at the lower end, the stop or rest surface forming an angle with the second axis. The wall portions forming the indentations 10b, 30c, 35b may be or may not be separated by a cut from the remaining wall portions at the lower ends of the indentations. The threads 31a, 32b, 32c and 36a of the three thread members are for instance trapezoid threads.

When the transferring means are in assembled state, the indentation 10b of the guiding tube 10 protrudes with small play into the groove 30a above the projection 30b so that the sleeve 30 can slide along the second axis 5, but is secured against rotations. The wall portion forming the indentation 30c of the displaceable sleeve 30 protrudes into the axial groove 35a of the tubular part 35 of the third thread member 33, secures the latter against rotations and guides the third thread member displaceably along the second axis 5. The indentations 35b, 35c and the projection 36b form securing and connecting means which secure the thread bush and/or nut 36 against rotations and axial displacements relative to the tubular part 35 and, thus, connect the thread bush and/or nut 36 at least approximately rigidly with the tubular part 35. The three thread members 31, 32, 33 are screwed into one another so that the thread 31a engages the thread 32a and that the thread 32c engages the thread 36a.

The indentation 10b and the projection 30b serve also as stops which can mutually engage, as shown in the FIGS. 2, 3, and determine so the uppermost possible position of the displaceable sleeve 30 relative to the support 2. The stop portion 31b formed by the annular enlargement of the first stop member 31 and the stop surface 32b of the second thread member 32 can also engage one another as shown in the FIGS. 2, 3 and form together stop means determining the uppermost possible position of the second thread member 32 relative to the first thread member 31. The upper end surface of the thread bush and/or nut 36 of the third thread member 33 can engage the tack weld stop 34 disposed at the upper end of the second thread member 32 as shown in the FIGS. 2 and 10. Therefore, the tack weld stop 34 and the upper end surface of the thread bush and/or nut 36 form stop means determining the uppermost possible position of the third thread 33 member relative to the second thread member 32. It may be remarked, that the indentation 30c of the displaceable sleeve 30 might possibly engage the projection caused by the indentation 35c on the outside of the tubular part 35 of the third thread member 33 in the uppermost position of the latter and define this uppermost position so that the indentation 30c and the wall portion forming the indentation 35c would then form stop means which might possibly replace the stop means formed by the tack weld stop 34 and the upper end surface of the bush and/or nut 36.

The load carrier 27 comprises for instance a more or less bowl-shaped bracket and is fixedly connected to the upper end of the tubular part 35 of the third thread member 33 by a connecting means. The latter comprises for instance a cap 38 pressed onto the tubular part 35 and/or welded to the latter and a rivet 39 fastening the load carrier 27 on the cap 38.

The parts 7, 8, 9, 10 of the support, the gearwheels 14, 15 and the parts 30, 31, 32, 35, 36 of the transferring means 25 consist all of metallic material, which is at least initially ductile and suited to be shaped by plastic, preferably cold or at least hot, non-cutting shaping. These parts can for instance consist of a mild steel and/or general-purpose constructional steel which has at least initially only a low carbon content everywhere, e.g. steel of the type SAE 1010.

The manufacturing and assembling of jack 1 will now be described. There may be provided for instance large, flat sheet metal pieces for manufacturing the base plate 7, the cap 8 and the two gearwheels 14, 15 of several jacks. In a first manufacturing step, blanks consisting of flat sheet metal members are prepared, viz. cut out of the large sheet metal pieces and thereby cut to size so that they have the appropriate contours and dimensions for forming the base plate, the cap and the gearwheels. The sheet metal members are also provided with the necessary holes. The blanks or sheet metal members and particularly the holes thereof may for instance be punched out. The flat sheet metal members are then shaped in a following step by plastic, non-cutting, cold shaping. Each sheet metal member is thereby shaped by means of a press and a pair of opposite dies, e.g. a matrice-shaped die and a stamp-shaped die, one of the dies being attached to a fixed support and the other die being attached to a displaceable member of the press. A sheet metal member to be shaped is disposed between the two dies. The displaceable die and the sheet metal member are then displaced and pressed by the press along a straight line towards and into the fixedly mounted die. Said straight line corresponds to the axis 4 or 5 of the final jack. Each of said parts 7, 8, 14, 15 and particularly the base plate 7 and the two gearwheels 14, 15 may for instance be shaped with use of a single pair of dies in a single plastic shaping operation or stroke. However, it might also possible to shape one or the part in several plastic shaping operations. The sheet metal members are shaped for instance substantially by deep drawing and/or possibly by extruding. It is pointed out that the plastic shaping and particularly the shaping of the guiding surfaces 7e, 15c and of the teeth 14d and 15d is achieved exclusively by pressing and moving dies along a straight line relative to one another and that no rotation of a die and/or sheet metal member and no rolling of a sheet metal member is necessary. Each annular guiding surface and each toothing is accordingly shaped along the entire circumference thereof at the same time, wherein the annular guiding surface and the toothing of the second gearwheel are shaped for instance simultaneously. It is also pointed out that the guiding surfaces 7e, 15c for holding the rolling bodies 21, the cross-sectional shapes or profiles and therewith substantially the complete shapes of the teeth of the two gearwheels 14, 15 and preferably also the shapes of the other surfaces of the base plate, cap and gearwheels are preferably defined exclusively by plastic, non-cutting shaping, i.e. without any further remachining or polishing or the like. It is remarked hereto that the outer rims of the gearwheels and therewith of the teeth thereof are formed by the outer rims of the initially flat sheet metal members cut to size. The curved and/or angled cross-sectional shapes of the base plate 7, the cap 8 and the gearwheels 14, 15 and the shapes of the teeth of the gearwheels are dimensionally stable in spite of the fact that they consist of relatively thin sheet metal members. The base plate and the gearwheels may be produced of sheet metals having originally, i.e. before the non-cutting shaping, a thickness which is at least 2 mm, at most 4 mm and for instance 2.5 mm to 3 mm. The maximum diameters of the two finished gearwheels 14 and 15 may for instance be about 40 mm to 50 mm and 85 mm to 100 mm, respectively.

When the plate 7 and the gearwheels 14, 15 have been shaped, they are submitted to a surface hardening including a thermal treating. The zones of the parts 7, 14, 15 adjacent to the surfaces and forming the surfaces of these parts are thereby carbonized and hardened to a depth of approximately 0.2 mm to 0.3 mm. This surface hardening contributes also to the dimensional stability to the parts 7, 14, 15 and reduces the wear in the use of the jack.

The bearing bush 9, the guiding tube 10, the displaceable sleeve 30, the first thread member 31, the second thread member 32, the tubular part 35 and the thread bush and/or nut 36 can be produced from cylindrical tubes of ductile steel. One can then at first cut off tube pieces having the desired length. One can then provide the tube piece intended to form the bearing bush 9 by cold, plastic, non-cutting shaping with the restriction 9b. The tube piece meant for forming the guiding tube 10 is provided by cold, plastic shaping—i.e. notching from the outside—with the indentation 10b. The tube pieces serving to form the displaceable sleeve 30 and the tubular part 35 are provided with a groove 30a and 35a, respectively, by milling. The tube piece meant to form the sleeve 30 is further provided with the projection 30b and the indentation 30c by cold, plastic shaping, e.g. notching from the inner and outer side, respectively. The tube pieces meant to form the first thread member 31 and the second thread member 32 are provided with threads by cutting or tapping or pressing. The tube piece intended to form the first thread member 31 is in addition provided with the stop portion 31b by plastic, non-cutting, hot projection forming, e.g. upsetting. The tubular part 35 is provided with the indentations 35b by cold, plastic shaping, e.g. notching from the outside before or after milling the groove 35a. The thread bush and/or nut 36 is inserted into the tubular part 35 so that the bush and/or nut 36 rests against the indentations 35b. One forms then the projection 36b and the indentation 35c simultaneously by cold, plastic shaping, e.g. by notching from the interior space of the bush and/or nut 36, and cuts or taps afterwards the internal thread 36a.

The bearing bush 9 and the guiding tube 10 are welded to the cap 8. The driving shaft 18 can be shaped by means of a lathe and is then welded to the first gearwheel 14. The first thread member 31 is welded to the second gearwheel 15. The two gearwheels connected with the driving shaft and the first thread member, respectively, are then preferably submitted to a heat treatment. One may also apply a drop of welding material to the second thread member 32 for forming the tack weld stop 34.

For assembling a jack, one pushes the driving shaft 18 previously connected with the first gearwheel 14 through the bearing bush 9, arranges the two gearwheels 14, 15 and the rolling bodies 21 in the interior space bounded by the base plate 7 and the cap 8, connects the base plate 7 and cap 8 by tack and/or projection welding and welds the handle adapter 19 to the driving shaft 18. The operations for assembling the various parts of the transferring means may be executed in a suitable sequence, wherein one or the other already mentioned operation for forming a projection or indentation or welding operation may possibly be made only after having assembled the transferring means at least in part.

The support 2, the gearwheels 14, 15, the rolling bearing 22, the transferring means 25 and, accordingly, the complete jack 1 can be manufactured and assembled rapidly and at low costs in series production. The described plastic shaping of the guiding and rolling surfaces 7e, 15c and of the teeth of the gearwheels makes it thereby possible to achieve and ensure easily a sufficient accuracy. It is also advantageous that the plastic shaping of the guiding and rolling surfaces 7e and 15c, of the teeth and of various indentations, projections and of other parts does not give rise to any waste material that gets "lost" and must be disposed of. As the base plate 7, the cap 8 and the gearwheels 14, 15 consist of sheet metal members, as the rolling bearing 22 consists exclusively of the base plate 7, the second gearwheel 15 and the rolling bodies 21 and comprises no additional bearing rings and no cage, as the base plate 7 and the cap 8 are connected by welding without screws or bolts or nuts or the like and as the transferring means 25 consists substantially of hollow, viz. tubular and/or sleeve-shaped parts, the jack is light in comparison with the size, the maximum carrying load and the height of stroke of the jack.

The support 2 and the transferring means 25 are configured and dimensioned in such a manner that the interior space of the housing formed by the support 2 can receive at least the major part of the transferring means 25, when the load carrier is in the lowermost position shown in FIG. 1. The displaceable sleeve encompasses then at least the largest part of the outermost thread member, viz. the third thread member 33. The latter contains then at least the largest part of the second thread member 32 which—in turn—contains at least the largest part of the first thread member 31.

If it is intended to use the jack for raising and/or lowering a load, e.g. a vehicle, a person can detachably couple a handle (not shown) to the handle adapter 19 so that the latter and the handle form together a crank. The person can then rotate the crank and therewith also—over the bevel gear 13—the first thread member 31. When the latter is rotated, the second thread member 32 is also temporarily rotated. The displaceable sleeve 30, the second thread member 32 and the third thread member 33 can thereby be displaced upward telescopically so that the load carrier 27 may be raised to the uppermost possible position shown in FIG. 2. If the crank and the gearwheels are rotated in the reverse direction, the load carrier can of course again be lowered. The gear ratio of 2.25 enables to raise or lower loads having a weight up to about 2000 kg with relatively great speed. The jack 1 has also a great stroke in comparison to the minimum height of the jack. If the load carrier 27 is in the uppermost position shown in FIG. 2, the jack has a height which is at least twice the height that the jack has in the lowermost position of the load carrier. The jack has for instance a minimum height of approximately 200 mm and a height of stroke of at least 200 mm and for instance approximately 250 mm.

The jack and the manufacturing thereof may be varied in various manners. One may for instance vary the dimensions and the numbers of teeth and/or the gear ratio of the two gearwheels. The second gearwheel 15 might possibly define a pitch surface which is plain and at right angles to the second axis instead of cone-shaped. It is pointed out that such a plain crown wheel is considered as bevel wheel. One might possibly even replace one of the gearwheels consisting of a sheet metal member, e.g. the first gear wheel 14, by a "conventional" gearwheel of a more massive type of construction, e.g. a cast gearwheel. The guiding surface 7e and/or the guiding surface 15c might be angled or partly angled and partly curved in cross-section. One of the guiding surfaces might even be flat, wherein the opposite guiding surface should then be groove-shaped in such a way that the rolling bodies are nevertheless not able to escape from the circular roll space or channel. One might further equip the rolling bearing 22 in addition with a light cage. It would also be possible to provide a transferring means having only two thread members instead of the three thread members 31, 32, 33.

What is claimed is:

1. A jack, comprising a support; first and second gearwheels rotatably supported by the support and having mutually meshing teeth; a load carrier for supporting a load; and transferring means operationally connecting the second gearwheel with the load carrier for converting a rotational movement of the second gearwheel into a linear displacement of the load carrier, wherein the support and the second gearwheel have annular guide surfaces for guiding together rolling bodies with the support, the second gearwheel, and the rolling bodies forming together a rolling bearing, wherein the annular guide surface and the teeth of the second gearwheel are formed by a portion of a one-piece sheet metal member, and wherein the annular guide surface and teeth-forming portion of one piece sheet metal is formed as at least one of a Z-shaped member and a S-shaped member having an outer section forming a flank of the annular guide surface.

2. A jack as claimed in claim 1, wherein the one-piece sheet metal member is formed of sheet steel and has carbonized and hardened surfaces.

3. A jack as claimed in claim 1, wherein the annular guide and the teeth-forming portion of the one-piece sheet metal member is formed as a plastically-shaped portion.

4. A jack as claimed in claim 1, wherein the annular guide and the teeth-forming portion of the one-piece sheet metal member has a substantially uniform thickness and two opposite surfaces extending substantially parallel to each other.

5. A jack as claimed in claim 1, wherein the one-piece sheet metal member has a thickness of at most 4 mm.

6. A jack as claimed in claim 1, wherein the one-piece sheet metal member has a thickness of at most 3 mm.

7. A jack as claimed in claim 1, wherein the support comprises a one-piece sheet metal member having a portion forming the annular guide surface of the support, wherein both guide surfaces have cross-sectional shapes which are at least partially at least one of a curved shape and an angled shape, and wherein the portions of the one-piece sheet metal members of the support and of the second gearwheel are formed as plastically-shaped portions.

8. A jack as claimed in claim 1, wherein the rolling bodies are guided exclusively by two annular guide surfaces provided, respectively, on the support and the second gearwheel.

9. A jack as claimed in claim 1, wherein the annular guide surface of the second gearwheel has a cross-sectional slope which is at least partially at least one of a curved slope and an angled slope.

10. A jack as claimed in claim 1, wherein the rolling bodies consist of balls having a ball radius, and wherein each annular guiding surface has a portion which is concavely curved in cross-section and has in cross-section a radius of curvature which is at least approximately equal to the ball radius.

11. A jack as claimed in claim 1, wherein said first gearwheel and second gearwheel are rotatable about a first axis and a second axis, respectively, and form together a bevel gear, wherein said load carrier is displaceable along the second axis and wherein at least one of said support and of said first gearwheel limits axial displacements of the second gearwheel along the second axis in such a manner that the rolling bodies cannot fall out of an annular roll space defined by said guiding surfaces.

12. A jack as claimed in claim 1, wherein the at least one of said first and second gearwheels, is the first gearwheel and wherein the teeth of the first gearwheel are formed of a portion the one-piece sheet metal member.

13. A jack as claimed in claim 12, further comprising a driving shaft, wherein the sheet metal member of the first gearwheel and the driving shaft are made of steel and are welded to one another, and wherein the support rotatably supports the driving shaft.

14. A jack as claimed in claim 1, wherein the annular guiding surface of the second gearwheel and the teeth of the second gearwheel are formed from one and same sheet metal member, and wherein the teeth of the second gearwheel are formed substantially by plastic shaping.

15. A jack as claimed in claim 14, wherein the transferring means comprises a first thread member and a second thread member, wherein the first thread member and the second thread member have mutually engaging threads, wherein the second gearwheel and the first thread member consist of steel and are welded to one another, and wherein the second thread member is operatively connected to the load carrier.

16. A jack, comprising a support; first and second gearwheels rotatably supported by the support and having mutually meshing teeth; a load carrier for supporting a load; and transferring means operatively connecting the second gearwheel with the load carrier for converting a rotational movement of the second gearwheel into a linear displacement of the load carrier;

wherein at least one of the first and second gearwheels is formed at least partially of a one-piece sheet metal member, and teeth of the at least one of the first and second gearwheels are formed of a portion of the one-piece sheet metal member and wherein the meshing teeth of the first and second gearwheels have convexly curved flanks, and wherein each tooth formed by the teeth-forming portion of the at least one of the first and away from another of the first and second gearwheels.

17. A jack as claimed in claim 16, wherein the at least one of the gearwheels is formed entirely of the one-piece sheet metal member.

18. A jack as claimed in claim 17, wherein the one-piece sheet metal member has a substantially uniform thickness.

19. A jack as claimed in claim 16, wherein the teeth-forming portion has a face side facing another of the first and second gearwheels and forms bridges connecting adjacent teeth, and wherein a rear side of the teeth and bridges is substantially parallel to the face side of the teeth and bridges.

20. A jack as claimed in claim 16, and wherein the meshing teeth of the first and second gearwheels have substantially involute-shaped flanks.

21. A jack as claimed in claim 16, wherein the first and second gearwheels are rotatable about first and second axes, respectively, wherein the first and second axes intersect each other and form together an angle of less than 90°, wherein the teeth of each of the first and second gearwheels define a cone-shaped pitch surface, wherein the one-piece sheet metal member has a central portion, wherein the teeth-forming portion is contiguous with the central portion and has a plurality of regular corrugations projecting outwardly away from the central portion, forming profiles of the teeth of the at least one of the first and second gearwheels and defining the cone-shaped pitch-surface of a respective gearwheel.

22. A jack as claimed in claim 16, wherein the teeth-forming portion of the one-piece sheet metal member is formed as a plastically-shaped portion.

23. A jack as claimed in claim 16, wherein both the first and second gearwheels are formed each at least partially of a one-piece sheet metal member, with the teeth of both first and second gearwheels being formed of plastically-shaped portions of respective one-piece sheet metal members.

24. A jack as claimed in claim 16, wherein the one-piece sheet metal members has a thickness of at most 4 mm.

25. A jack as claimed in claim 16, wherein the one-piece sheet metal member has a thickness of at most 3 mm.

26. A jack as claimed in claim 16, wherein the one-piece sheet metal member is formed of a sheet steel and has at least one carbonized and hardened surface.

27. A jack, comprising a support; first and second gearwheels rotatably supported by the support and having mutually meshing teeth; a load carrier for supporting a load; and transferring means operatively connecting the second gearwheel with the load carrier for converting a rotational movement of the second gearwheel into a linear displacement of the load carrier, wherein at least one of the first and second gearwheels is formed at least partially of a one-piece sheet metal member, and teeth of the at least one of the first and second gearwheels are formed of a portion of the one-piece sheet metal member, wherein the at least one of the first and second gearwheels and is formed entirely of one-piece sheet metal member having a central portion provided with a central hole, wherein the central portion has a portion which extends outwardly of the central hole and has at least one of approximately Z-shaped radial cross-section and S-shaped radial cross-section, whereby a collar, which has a surface bordering the central hole, is formed.

28. A jack, comprising a support; first and second gearwheels rotatably supported by the support and having mutually meshing teeth; a load carrier for supporting a load; and transferring means operationally connecting the second gearwheel with the load carrier for converting a rotational movement of the second gearwheel into a linear displacement of the load carrier, wherein the support and the second gearwheel have annular guide surfaces for guiding together rolling bodies with the support, the second gearwheel, and the rolling bodies forming together a rolling bearing, wherein the annular guide surface and the teeth of the second gearwheel are formed by a portion of a one-piece sheet metal member, wherein the teeth-forming portion of the one-piece sheet metal member and the annular guide surface of the second gearwheel have a common central portion provided with a central hole, and wherein the central portion has a portion which extends outwardly of the central hole and has at least one of approximately Z-shaped radial cross-section and S-shaped radial cross-section, whereby a collar, which has a surface bordering the central hole, is formed.

\* \* \* \* \*